United States Patent
Gaynes et al.

(10) Patent No.: US 9,181,440 B2
(45) Date of Patent: Nov. 10, 2015

(54) LOW ALPHA PARTICLE EMISSION ELECTRICALLY-CONDUCTIVE COATING

(71) Applicant: International Business Machines Corporation, Armonk, NY (US)

(72) Inventors: Michael A. Gaynes, Vestal, NY (US); Michael S. Gordon, Yorktown Heights, NY (US); Eric P. Lewandowski, White Plains, NY (US)

(73) Assignee: GLOBALFOUNDRIES U.S. 2 LLC, Hopewell Junction, NY (US)

( * ) Notice: Subject to any disclaimer, the term of this patent is extended or adjusted under 35 U.S.C. 154(b) by 0 days.

(21) Appl. No.: 14/013,390

(22) Filed: Aug. 29, 2013

(65) Prior Publication Data
US 2014/0205780 A1    Jul. 24, 2014

Related U.S. Application Data

(63) Continuation of application No. 13/744,468, filed on Jan. 18, 2013, now Pat. No. 8,815,725.

(51) Int. Cl.
*H01L 23/48* (2006.01)
*C09D 5/24* (2006.01)
(Continued)

(52) U.S. Cl.
CPC .. *C09D 5/24* (2013.01); *H01B 1/20* (2013.01); *H01B 1/22* (2013.01); *H01B 1/24* (2013.01); *Y10T 428/1372* (2015.01)

(58) Field of Classification Search
CPC .......... C09D 5/24; C09D 7/1216; H01B 1/20; H01B 1/22; H01B 1/24; Y10T 428/1372
USPC .......................................................... 257/734
See application file for complete search history.

(56) References Cited

U.S. PATENT DOCUMENTS 4,414,142 A * 11/1983 Vogel et al. ................... 252/506
4,653,125 A    3/1987 Porter
(Continued)

FOREIGN PATENT DOCUMENTS

| JP | 5-121578 | 5/1993 |
| JP | 5239180 A | 9/1993 |
| JP | 6061303 A | 3/1994 |

OTHER PUBLICATIONS

Gordon et al., ("An Evaluation of an Ultralow Background Alpha-Particle Detector") IEEE Transaction on Nuclear Science, vol. 56, No. 6, Dec. 2009.*

(Continued)

*Primary Examiner* — A. Sefer
(74) *Attorney, Agent, or Firm* — Scully, Scott, Murphy & Presser, P.C.

(57) ABSTRACT

An electrically conductive paste providing low alpha particle emission is provided. A resin and conductive particles are mixed, and a curing agent is added. A solvent is subsequently added. The electrically conductive paste including a resin compound is formed by mixing the mixture in a high shear mixer. The electrically conductive paste can be applied to a surface of an article to form a coating, or can be molded into an article. The solvent is evaporated, and the electrically conductive paste is cured to provide a graphite-containing resin compound. The graphite-containing resin compound is electrically conductive, and provides low alpha particle emission at a level suitable for a low alpha particle emissivity coating.

8 Claims, 3 Drawing Sheets

(51) Int. Cl.
*H01B 1/20* (2006.01)
*H01B 1/22* (2006.01)
*H01B 1/24* (2006.01)

(56) References Cited

U.S. PATENT DOCUMENTS

| | | | |
|---|---|---|---|
| 4,931,852 A | 6/1990 | Brown et al. | |
| 5,173,764 A | 12/1992 | Higgins, III | |
| 6,047,287 A | 4/2000 | Caruana | |
| 6,137,164 A | 10/2000 | Yew et al. | |
| 6,238,599 B1 * | 5/2001 | Gelorme et al. | 252/514 |
| 6,433,057 B1 | 8/2002 | Bhagwagar et al. | |
| 6,462,108 B1 | 10/2002 | Ruyters et al. | |
| 2003/0105207 A1 * | 6/2003 | Kleyer et al. | 524/439 |
| 2007/0129481 A1 | 6/2007 | Yamaguchi et al. | |
| 2009/0162637 A1 | 6/2009 | Grabowsky et al. | |
| 2010/0090176 A1 * | 4/2010 | Kosowsky et al. | 252/511 |
| 2011/0267791 A1 | 11/2011 | Tomisaka et al. | |
| 2012/0213563 A1 * | 8/2012 | Qi et al. | 399/333 |
| 2012/0321850 A1 | 12/2012 | Gilmartin et al. | |

OTHER PUBLICATIONS

World Precision Instruments, Inc., #7335 Electrically Conductive Carbon Epoxy, Instruction Manual, 2 pages, www.wpiinc.com.
Creative Materials, "Carbon Filled, Electrically Conductive Adhesive" 107-25, Revision Date: Sep. 5, 2008, www.creativematerials.com.
ALFA International Corporation, ALFABOND 61, Carbon filled electrically conductive epoxy. Maximum continuity of conductivity, high adhesion; can be thinned as a coating for FRI and EMI shielding. 2 pages, www.alfaadhesives.com.
Masterbond: Adhesives, Sealants, Coatings, "Graphite Filled, Electrically Conductive Adhesives" 2 pages.
Office Action dated Jan. 27, 2014 received in a related U.S. Patent Application, namely U.S. Appl. No. 13/744,468.

* cited by examiner

US 9,181,440 B2

LOW ALPHA PARTICLE EMISSION ELECTRICALLY-CONDUCTIVE COATING

CROSS REFERENCE TO RELATED APPLICATION

This application is a continuation of U.S. patent application Ser. No. 13/744,468, filed Jan. 18, 2013 the entire content and disclosure of which is incorporated herein by reference.

BACKGROUND

The present disclosure relates to a conductive coating material, and particularly to a graphite-containing conductive coating material and a method of forming the same.

Low alpha particle emission materials are employed in packaging materials. Alpha-particle emission from packaging materials, near the active layers of the chip, is now measured in single-digits of alpha particles/khr-cm$^2$. Few materials provide alpha particle emission as low as, or even lower than, 2 α/khr-cm$^2$.

Measuring the alpha particle activity at this low level is challenging with the present-day proportional detectors. Recently developed ionization detectors employ active signal rejection based on pulse-shape analysis and therefore have ultra-low background detection levels. One problem with such detectors is that, for samples that are smaller in dimension than the dimension of the anode, the detectors cannot distinguish alpha particles from the sample tray from the alpha particles emitted from the sample itself. Thus, a low alpha particle emission electrically-conductive material is desired to coat the sample tray.

SUMMARY

An electrically conductive paste providing an ultra-low alpha particle emission is provided. A resin and conductive particles are mixed to form a mixture, to which a solvent can be subsequently added. The electrically conductive paste including a resin compound is formed by mixing the mixture in a high shear mixer. A curing agent is mixed in. The electrically conductive paste can be applied to a surface of an article to form a coating, or can be molded onto an article. The solvent is evaporated, and the electrically conductive paste is cured to provide a conductive-particle-containing resin compound. The conductive-particle-containing resin compound is electrically conductive, and provides low alpha particle emission at a level suitable for coating a semiconductor package or a sample tray in an alpha particle counter.

According to an aspect of the present disclosure, a method of forming an electrically conductive material portion is provided. A mixture of a resin and a suspension of conductive particles in a solution is formed. If necessary a solvent and/or surfactant can be added to ensure the conductive particles are well dispersed and to obtain the desired viscosity. A curing-agent-including mixture is formed by adding a curing agent to the mixture. An electrically conductive paste-containing structure is formed in a form of a coating or a mold of the electrically conductive paste. A conductive-particle-containing resin compound is formed by evaporating the solvent from the electrically conductive paste-containing structure.

According to another aspect of the present disclosure, an article of manufacture including an electrically conductive material is provided. The electrically conductive material includes a cross-linked polymer of a resin in which conductive particles are embedded therein.

DETAILED DESCRIPTION

Figure 1:
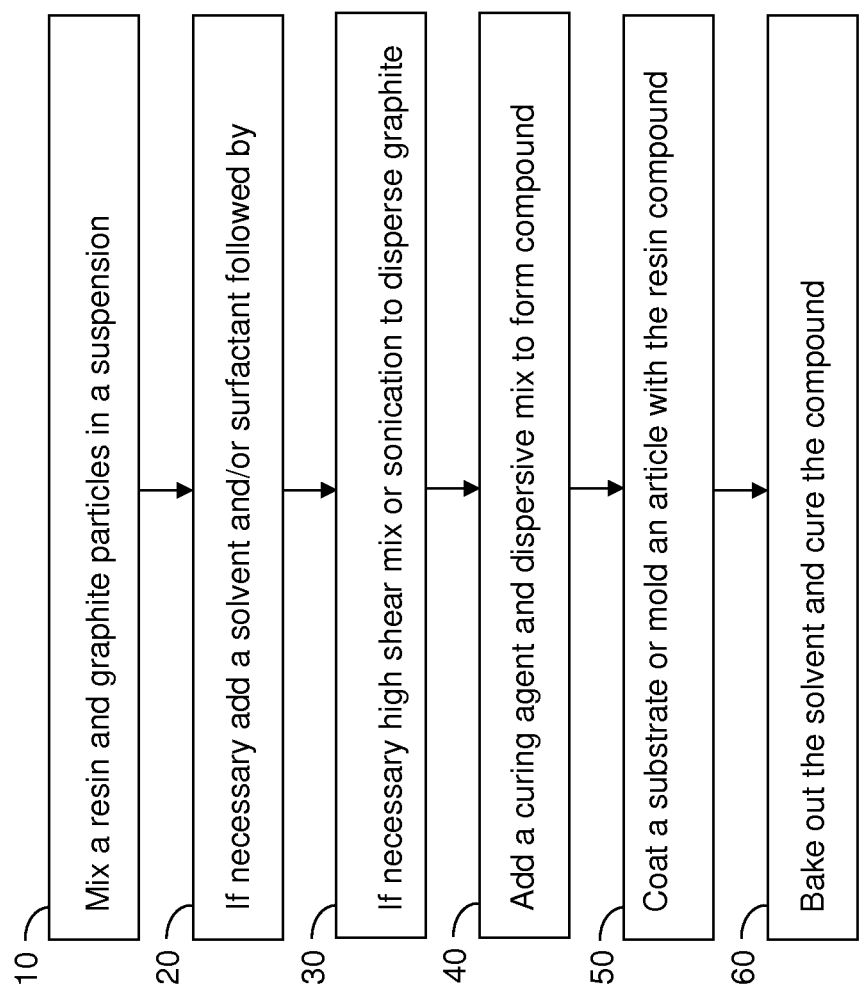
FIG. 1 is a flow chart illustrating the steps of a process for forming a conductive-particle-containing resin compound according to an embodiment of the present disclosure.

As stated above, the present disclosure relates to a conductive-particle-containing electrically-conductive coating material and a method of forming the same. Aspects of the present disclosure are now described in detail with accompanying figures. It is noted that like reference numerals refer to like elements across different embodiments. The drawings are not necessarily drawn to scale.

Polymer materials are essentially alpha particle free and also are an effective barrier in blocking movement of alpha particles from a source to an area that is sensitive to alpha particle radiation such as the binary state of a device in modern semiconductor devices. Typically, polymers are electrically insulating except for a small class of polymers that are intrinsically electrically conductive polymers (ICP) due to conjugated chemical bonding or pi bonds, which result in electrons being much more mobile compared to electron pairs that are shared in covalent bonds. The better known ICPs, polyaniline and polyethylenedioxythiophene, are typically applied as a thin coating that would be much less than 50 micrometers thick. Therefore, several layers would have to be applied to build up to a thickness that is 50 micrometers or more. Also, ICPs are expensive compared to most non ICP based coatings and encapsulants. Common resin chemistries that are suitable for polymer based coating formulations include epoxies, acrylics, silicones, urethanes and polyimides. Key attributes that are required for a polymer resin include inherently low alpha emissivity and compatibility with a solvent to allow viscosity control for the purposes of coating. For illustration purposes, the invention described herein will use a paste resin. However, one skilled in the art will know that many different resin chemistries can be used as a basis for a formulation that can be applied as a surface coating.

Paste based coatings can be made electrically conductive by adding electrically conductive particles to a level that reaches or slightly exceeds the percolation threshold for a specific particle geometry: spheres, platelets, ellipsoids, filaments or rods.

As used herein, "conductive particles" refers to particles having a maximum lateral dimension in a range from 10 nanometers to 100 micrometers and containing a material having a bulk electrical conductivity (as measured in bulk or in an aggregate state for carbon nanotubes) greater than $10^{-1}$ S/cm at 20° C.

The conductive particles of the present disclosure may be graphite particles, carbon nanotubes, particles of elemental metals, particles of intermetallic alloys, particles of conductive metal compounds, particles of ICPs or combinations thereof.

Many conductive materials such as graphite, copper, silver, nickel gold, aluminum, are typically mined from the earth and therefore, could have a high level of radioactivity that far exceeds the low levels that are of interest. According to embodiments of the present disclosure, only conductive materials having low alpha particle emission are employed in order to provide a low alpha particle emission surface. As used herein, "low" alpha particle emissivity refers to alpha particle emissivity less than 2 α particles/khr-cm².

Alpha-particle emissivity is given in areal units because alpha particles emanating from far below the surface are absorbed by the material above it. For instance, a 10 million electron-volt (MeV) α-particle has a range of about 70 micrometers in silicon. So any alpha particles that are emitted below about 70 micrometers from the surface will not be detected at the surface.

In order to provide a conductive material having a low alpha particle emissivity, the following method can be employed.

First, high electrical conductivity materials having an electrical conductivity greater than $2.0 \times 10^4$ S/cm at 20° C. are selected. Such high conductivity elemental metals including Al, Ti, Fe, Ni, Cu, Mo, Sn, Ta, W, Pt, Au, intermettalic alloys or conductive metal compounds are considered. In one embodiment, the conductive particles are particles of an elemental metal selected from Al, Ti, Fe, Ni, Cu, Mo, Sn, Ta, W, Pt, and Au; particles of intermetallic alloys of at least two of Al, Ti, Fe, Ni, Cu, Mo, Sn, Ta, W, Pt, and Au; or a conductive metal compound including at least one of Al, Ti, Fe, Ni, Cu, Mo, Sn, Ta, W, Pt, and Au.

Second, a high purity conductive material is obtained and analyzed for alpha particle emissivity. As used herein, a "high purity" material refers to a material having a purity of at least two 9's, i.e., a material in which the atomic percentage of the target material is at least 99%.

Third, candidate materials can be tested for their alpha particle emissivity after they are formed into a flat large-area sheet and measured using either a proportional or ionization detector.

Last, the high purity conductive material is crushed or otherwise changed into particles having a maximum size in a range from 10 nanometers to 100 micrometers. If the high purity conductive material is provided as particles, this step may be omitted. In one embodiment, if this step is performed, the emissivity of the powder or particles can be determined after they are mixed into and form the conductive layer.

In one embodiment the high purity conductive material can be synthetic graphite.

Synthetic graphite is made by processing petroleum coke and coal tar at extremely high temperatures such as 2,500° C.-3,000° C. Impurities present in the starting raw materials are reduced significantly.

It has been discovered that adding high purity, synthetic graphite particles to common paste resin results in a formulation that can be applied to a thickness that reaches or exceeds 50 micrometers by spin coating, pouring or spray coating. The graphite containing paste coating adheres well to mineral oxide surfaces such as an aluminum plate or silicon, or other substrates such as copper; is thick enough to block the travel of alpha particles that attempt to escape from the substrate materials such as aluminum and other materials, and is electrically conductive.

In another embodiment the high purity conductive material can be carbon nanotubes.

Because of their high aspect ratio (length to diameter), the percolation threshold is reduced so less material is required compared to spherical particles.

In yet another embodiment, the high purity conductive material can be particles of an elemental metal, an intermetallic alloy, or a conductive metal compound. Exemplary conductive particles in this category include, but are not limited to, particles of Al, Ti, Fe, Ni, Cu, W, Mo, Sn, Ta, Pt, Au.

The overall electrical conductivity of the paste can be varied based on the intrinsic conductivity of the particles, the geometry and the volume fraction loading.

Referring to FIG. 1, a flow chart illustrates the steps of a process for forming an electrically conductive material according to an embodiment of the present disclosure. The electrically conductive material is a conductive-particle-containing paste compound.

Referring to step 10, a resin and conductive particles in a suspension are mixed. The resin is mainly a viscous liquid. The viscosity of the resin can be, for example, in a range from $10^{-2}$ Pa-s to $10^3$ Pa-s.

In one embodiment, the resin can be paste resin. The paste resin can include reactive prepolymers that contain epoxide groups and/or polymers that contain epoxide groups. The paste resin can also be referred to as polyepoxides. Paste resins may become cross-linked either among themselves through catalytic homopolymerisation, or with a wide range of co-reactants including polyfunctional amines, acids (and acid anhydrides), phenols, alcohols and thiols.

In one embodiment, the paste resin can be selected from a variety of paste resins having a relatively low viscosity so that the amount of solvent for the suspension may be reduced. In one embodiment, the viscosity of the paste resin can be in a range from 5 Pa·s to 20 Pa·s at 25° C. In one embodiment, the viscosity of the paste resin can be in a range from 11 Pa·s to 14 Pa·s at 25° C. In one embodiment, the paste resin can be a liquid reaction product of epichlorohydrin and bisphenol A such as D.E.R.™ 331 manufactured by The Dow Chemical Company.

The conductive particles in the suspension can be provided by mixing conductive particles with an organic solution. In one embodiment, synthetic graphite formed at an elevated temperature in a range from 2,500° C. to 3,000° C. can be employed. In another embodiment, carbon nanotubes can be employed. In yet another embodiment, conductive particles having alpha emissivity less than 2 α/khr-cm² may be employed. The purity of the conductive particles can be greater than 99.9% in atomic percentage. In one embodiment, the purity of the conductive particles can be greater than 99% in atomic percentage. In another embodiment, the purity of the conductive particles can be greater than 99.999% in atomic percentage.

The size of the conductive particles can be selected such that a predominant portion (i.e., more than 50%) of the conductive particles has a maximum lateral dimension in a range from 10 nanometers to 100 micrometers. In one embodiment, the predominant portion of the conductive particles can have a maximum lateral dimension in a range from 10 micrometers to 80 micrometers.

The amount of the conductive particles can be selected such that the volume percentage of the conductive particles with respect to a total volume of the resin and the conductive particles is in a range from 0.1% to 40%. In order to enable application of the coating, a solvent may be required to decrease the viscosity. Since the solvent will evaporate off after application, it is not considered when determining the volume percent filler. Alternatively, a reactive diluent could also be used to lower viscosity. A reactive diluent will react with the curing resin and therefore should be included when establishing the volume fraction of filler.

The organic solution can include any solvent provided that the resin is soluble in the organic solvent and the organic solvent can help disperse the conductive particles. Exemplary organic solution that can be employed to provide a suspension of conductive particles include, but are not limited to, N-methyl-2-pyrrolidone (NMP), dimethylformamide (DMF), and dichloroethane (DCE). The conductive particles can be poured into the organic solvent, and the mix of the conductive particles and the organic solvent can be mixed to suspend the conductive particles in the organic solvent.

In one embodiment, the suspension of the conductive particles in the solution (i.e., organic solvent) can be provided by pouring the conductive particles into the organic solvent and employing a tip sonicator to disperse the conductive particles within the organic solvent. The sonicator may be operated for a time duration from 1 minute to 1 hour. A mixture of a resin and a suspension of conductive particles in a solution is thus provided.

Optionally, a surfactant may be added to the suspension of the conductive particles in the solution to enhance dispersion of the conductive particles within the solution. Exemplary surfactants that may be employed for this purpose include, but are not limited to, Triton x-100, or Octaethylene glycol monododecyl ether.

The resin and the suspension of the conductive particles is subsequently mixed, for example, by pouring the resin into the suspension and mixing the resin and the suspension, for example, by shaking or stirring.

Optionally, some of the organic solvent may be evaporated from the mixture to increase the density of the conductive particles and resin. In one embodiment, the mixture may be placed in vacuum or under reduced pressure (less than 1 atmosphere pressure) to facilitate evaporation of the organic solvent.

Referring to step 20, a curing-agent-including mixture is formed by adding a curing agent to the mixture of the resin, the conductive particles, and the organic solvent. A curing agent is a chemical that can react with the epoxide groups in paste resin to form a highly crosslinked, three-dimensional network of chemical bonds. The curing agent can also be referred to as a hardener. The composition of the curing agent can be selected based on the curing temperature to be subsequently employed. For example, if curing at an elevated temperature is desired, a curing agent that is cured at the elevated temperature can be employed, and if curing at room temperature is desired, a curing agent that is cured at room temperature (25° C.) can be employed. The curing agent can be selected from commercially available curing agents such as various Ancamine® curing agents available from Air Products. For example, Ancamine 1922a can provide curing in 2-7 days at room temperature or in 2 hours at 100° C. The volume of the curing agent relative to the volume of resin can be in a range from 0.01 to 0.5, although lesser and greater ratios can also be employed.

Referring to step 30, an electrically conductive paste is formed by adding a solvent to the curing-agent-including mixture. The added solvent is an organic solvent that dissolves the resin. In one embodiment, the added solvent can be the same material as the organic solvent employed to form a suspension at step 10, i.e., the added solvent and the organic solvent in the suspension at step 10 can have the same composition.

The amount of the added solvent can be determined based on the desired viscosity of the electrically conductive paste thus formed. In one embodiment, the viscosity of the electrically conductive paste is selected such that a high shear mixer can homogenize the mixture of the resin, particles and optional solvent. As used herein, a high shear mixer refers to a mixer capable of mixing a fluid having a viscosity greater than 0.2 Pa-s.

Referring to step 40, a high-shear mixer is a mixer that disperses an ingredient within a matrix material to homogenize the distribution of the ingredient within the matrix material. The high-shear mixer includes a sawtooth type blade or Cowles blade rotating at greater than 2000 RPM in a reservoir containing the materials to be mixed, to provide shear. An electrically conductive paste including a resin compound is formed after the added solvent and the curing-agent-including mixture are mixed in the high-shear mixer. The conductive particles provide the electrical conductivity in the electrically conductive paste. The conductivity of the electrically conductive paste may be controlled by changing the volume percentage of the conductive particles with respect to the total volume of the conductive particles and the resin.

Referring to step 50, an electrically conductive paste-containing structure can be formed in the form of a coating, or in the form of a mold, of the electrically conductive paste. For example, a substrate may be coated with the electrically conductive paste. Alternately, the electrically conductive paste may be molded into a shape prior to, or during, baking.

Referring to step 60, the electrically conductive paste-containing structure, whether in the form of a coating or in the form of a mold, is cured by inducing cross-linking of the polymers in the resin. Curing of the electrically conductive paste-containing structure enhances cross-linking within the electrically conductive paste-containing structure. In one embodiment, the curing of the electrically conductive paste-containing structure can be performed at room temperature or with heat to temperatures as high or higher than 60 degrees Celsius.

Optionally, a baking step may be performed before the curing process. During the baking step, the solvent is evaporated from the electrically conductive paste-containing structure at room temperature or at an elevated temperature. If the baking step is performed at the elevated temperature, the elevated temperature may be selected so that cross-linking of the polymers does not occur, or may be selected so that cross-linking of the polymers occurs concurrently with the evaporation of the organic solvent. In one embodiment, two different temperatures may be employed so that the organic solvent is evaporated at the first temperature, and the curing (i.e., cross-linking) of the resin occurs at the second temperature that is higher than the first temperature.

The organic solvent is removed during the curing of the electrically conductive paste. The cured material is a conductive-particle-containing resin compound that can suppress alpha particle emission from the surfaces to which the conductive-particle-containing paste compound is in contact.

Figure 2:
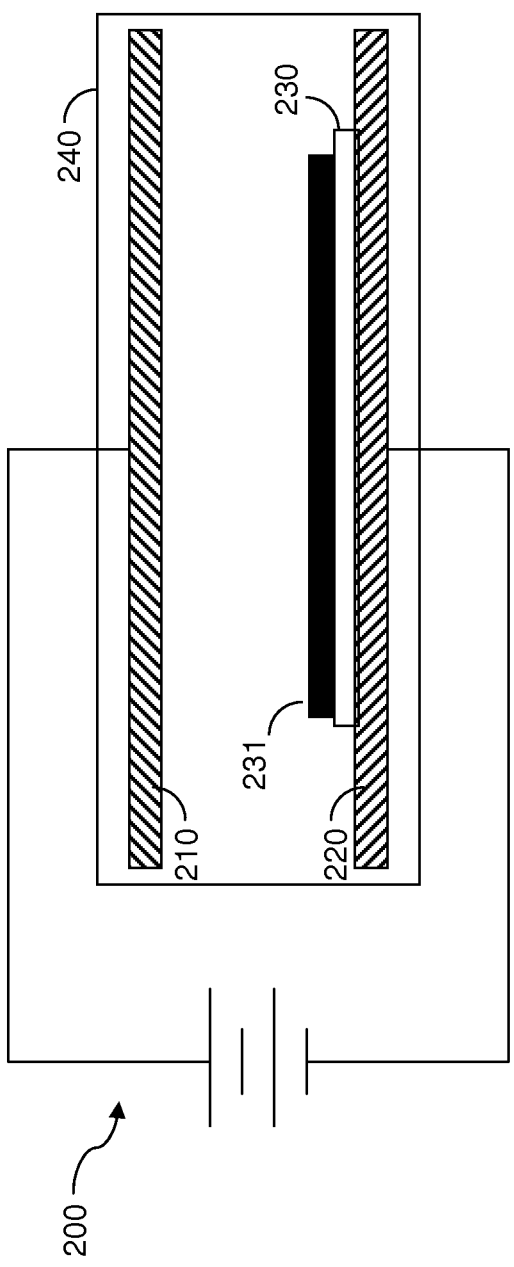
FIG. 2 is a cross-sectional view of an alpha particle detector including a coating of a conductive-particle-containing paste compound on a sample tray according to an embodiment of the present disclosure.

Referring to FIG. 2, the electrically conductive paste-containing structure can be an electrically conductive coating 231 on a sample tray 230 in an alpha particle counter 200. In this case, the substrate to which the electrically conductive paste is applied is the sample tray 230. The alpha particle counter can also include a first electrode 210, a second electrode 220, a gas enclosure 240, and components for providing electrical bias to the first and second electrodes (210, 220) and amplifiers or preamplifiers. After curing of the electrically conductive paste, an electrically conductive material can be applied to the sample tray 230, or to an intermediate material that is placed in contact with the sample tray 230 and is present as a surface coating. In one embodiment, the sample tray 230 forms the second electrode, 220. In another embodiment the second electrode is grounded. In yet another embodiment, the first electrode is biased with a positive high voltage.

Alpha particle emission from the sample tray 230 can be suppressed by the coating 231 in contact with the sample tray 230. Thus, the electrically conductive paste of the present disclosure can allow use of less expensive metal conductors as base metal for the sample tray or other materials in "low-background" charged particle detectors.

Figure 3:
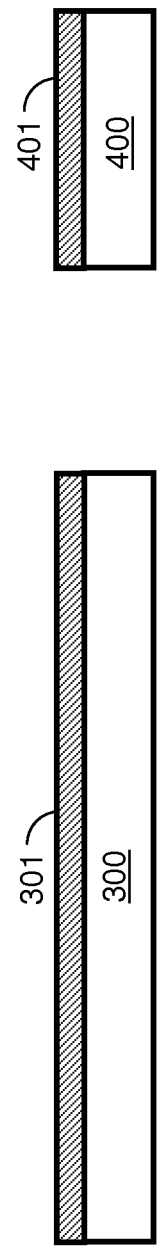
FIG. 3 is a cross-sectional view of a semiconductor substrate including a coating of a conductive-particle-containing paste compound thereupon according to an embodiment of the present disclosure.

Referring to FIG. 3, the electrically conductive paste-containing structure can be a conductive coating 301 on a semiconductor substrate 300. The semiconductor substrate 300 can include a semiconductor layer, at least one semiconductor device formed on the semiconductor layer, and at least one dielectric material layer and metal interconnect structure embedded therein. The electrically conductive coating 301 is a coating of a conductive-particle-containing resin compound. After curing of the electrically conductive paste, an electrically conductive material is present as a surface coating on the semiconductor substrate 300. Alpha particles impinging onto top of the semiconductor substrate 300 can be stopped by the conductive coating.

Figure 4:
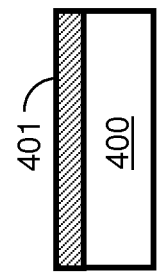
FIG. 4 is a cross-sectional view of a semiconductor chip including a coating of a conductive-particle-containing paste compound thereupon according to an embodiment of the present disclosure.

Referring to FIG. 4, the electrically conductive paste-containing structure can be a conductive coating 301 on a semiconductor chip 400. The semiconductor chip 400 can be derived from a semiconductor substrate after formation of semiconductor devices thereupon by dicing the semiconductor substrate. The semiconductor chip 400 can include a semiconductor layer, at least one semiconductor device formed on the semiconductor layer, and at least one dielectric material layer and metal interconnect structure embedded therein. The conductive coating 401 is a coating of an electrically conductive-particle-containing resin compound. After curing of the electrically conductive paste, an electrically conductive material is present as a surface coating on the semiconductor chip 400. Alpha particles impinging onto the top of the semiconductor chip 400 can be stopped by the electrically conductive coating.

Various articles of manufacture including an electrically conductive material can be formed employing the method of the present disclosure. The electrically conductive material includes a cross-linked polymer of a resin in which conductive particles are embedded therein. In one embodiment, a predominant portion of the conductive particles has a maximum lateral dimension in a range from 100 nanometers to 100 micrometers within the cured conductive-particle-containing resin compound. In one embodiment, a volume percentage of conductive particles in the electrically conductive material can be in a range from 0.1% to 40% in the cured conductive-particle-containing resin compound. In one embodiment, a purity of conductive material in the conductive particles can be greater than 99% in atomic percentage in the conductive-particle-containing resin compound.

Figure 5:
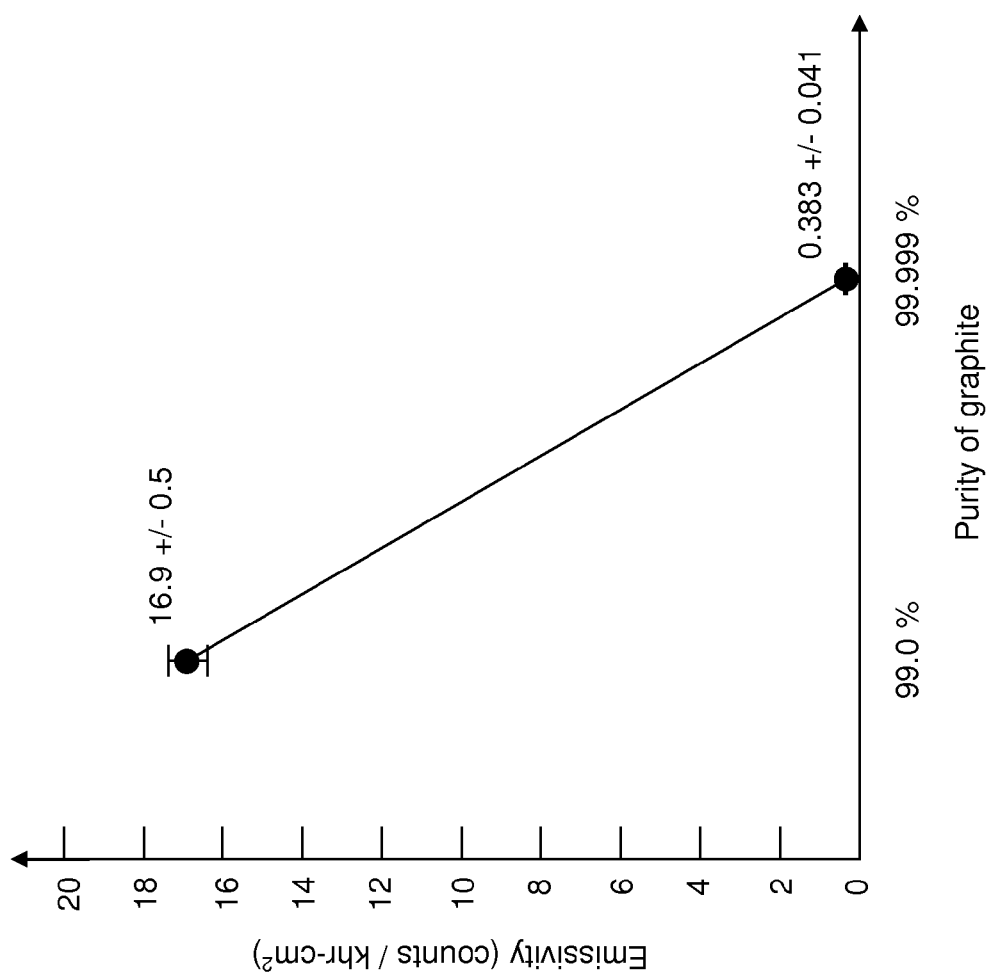
FIG. 5 is a graph illustrating the dependency of alpha particle emissivity from 300 mm semiconductor substrates having a coating of a graphite-containing resin compound on the purity of graphite particles within the graphite-containing resin compound according to an embodiment of the present disclosure.

The alpha-particle emissivity of the electrically conductive-particle-containing resin compound can be affected by the purity of the conductive particles employed to form the conductive-particle-containing paste compound. FIG. 5 is a graph illustrating the dependency of alpha particle emissivity from 300 mm semiconductor substrates having a coating of a graphite-containing paste compound on the purity of graphite particles within the graphite-containing resin compound. It can be seen that an about 200 micrometer thick coating of a conductive graphite-containing resin compound derived from 99.999% pure graphite particles on a 300 mm semiconductor substrate provides an emissivity of 0.38+/−0.04 alphas/khr-cm$^2$, while an about 200 micrometer thick coating of a conductive graphite-containing resin compound derived from 99% pure graphite particles on a 300 mm semiconductor substrate provides an emissivity of 16.9+/−0.5 alphas/khr-cm$^2$. The difference in the emissivity of alpha particles is due to the impurities present in the graphite particles. Thus, the alpha particle emissivity of the electrically conductive paste and the cured conductive graphite-containing resin compound can be minimized by employing high purity graphite particles.

While the disclosure has been described in terms of specific embodiments, it is evident in view of the foregoing description that numerous alternatives, modifications and variations will be apparent to those skilled in the art. Each of the embodiments described herein can be implemented individually or in combination with any other embodiment unless expressly stated otherwise or clearly incompatible. Accordingly, the disclosure is intended to encompass all such alternatives, modifications and variations which fall within the scope and spirit of the disclosure and the following claims.

What is claimed is:

1. An article of manufacture comprising:
    an electrode;
    a sample tray in an alpha particle counter, wherein a bottommost surface of said sample tray is in direct physical contact with a topmost surface of said electrode; and
    an electrically conductive material, wherein said electrically conductive material is present directly on a topmost surface of said sample tray, and wherein said electrically conductive material comprises a cross-linked polymer of a resin in which conductive particles are embedded therein and having an alpha particle emissivity less than 2 α particles/khr-cm$^2$.

2. The article of manufacture of claim 1, wherein a predominant portion of said conductive particles has a maximum lateral dimension in a range from less than 1 micrometer to 100 micrometers.

3. The article of manufacture of claim 1, wherein a volume percentage of conductive particles with respect to a total volume of said resin and said conductive particles is in a range from 0.1% to 40%.

4. The article of manufacture of claim 1, wherein a purity of conductive particles in said conductive particles is greater than 99% in atomic percentage.

5. The article of manufacture of claim 1, wherein said resin has a viscosity in a range from $10^{-2}$ Pa-s to $10^3$ Pa-s.

6. The article of manufacture of claim 1, wherein said electrically conductive material comprises graphite.

7. The article of manufacture of claim 1, wherein said electrically conductive material comprises carbon nanotubes.

8. The article of manufacture of claim 1, wherein said electrically conductive material is particles of an elemental metal selected from Al, Ti, Fe, Ni, Cu, Mo, Sn, Ta, W, Pt, and Au; particles of intermettalic alloys of at least two of Al, Ti, Fe, Ni, Cu, Mo, Sn, Ta, W, Pt, and Au; or a conductive metal compound including at least one of Al, Ti, Fe, Ni, Cu, Mo, Sn, Ta, W, Pt, and Au.

* * * * *